(12) United States Patent
Kim et al.

(10) Patent No.: US 10,988,601 B2
(45) Date of Patent: Apr. 27, 2021

(54) CARBOXYLIC ACID-MODIFIED NITRILE-BASED COPOLYMER LATEX AND LATEX COMPOSITION FOR DIP MOLDING COMPRISING SAME

(71) Applicant: LG Chem, Ltd., Seoul (KR)

(72) Inventors: Jung Eun Kim, Daejeon (KR); Wonsang Kwon, Daejeon (KR); Seung Uk Yeu, Daejeon (KR); Hyunwoo Kim, Daejeon (KR)

(73) Assignee: LG Chem, Ltd.

( * ) Notice: Subject to any disclaimer, the term of this patent is extended or adjusted under 35 U.S.C. 154(b) by 152 days.

(21) Appl. No.: 16/328,111

(22) PCT Filed: Oct. 30, 2017

(86) PCT No.: PCT/KR2017/012067
§ 371 (c)(1),
(2) Date: Feb. 25, 2019

(87) PCT Pub. No.: WO2018/105891
PCT Pub. Date: Jun. 14, 2018

(65) Prior Publication Data
US 2019/0185641 A1    Jun. 20, 2019

(30) Foreign Application Priority Data

Dec. 9, 2016  (KR) .................. 10-2016-0167341
Oct. 12, 2017  (KR) .................. 10-2017-0132671

(51) Int. Cl.
*C08L 9/04* (2006.01)
*C08L 13/02* (2006.01)
*C08J 5/02* (2006.01)
*C08K 3/22* (2006.01)
*C08L 15/00* (2006.01)
*C08K 5/36* (2006.01)
*C08K 5/09* (2006.01)
*C08K 5/37* (2006.01)
*C08F 236/12* (2006.01)
*C08F 222/02* (2006.01)
*C08F 220/06* (2006.01)
*A41D 19/00* (2006.01)
*C08K 5/42* (2006.01)

(52) U.S. Cl.
CPC .............. *C08L 9/04* (2013.01); *C08F 220/06* (2013.01); *C08F 222/02* (2013.01); *C08F 236/12* (2013.01); *C08J 5/02* (2013.01); *C08K 3/22* (2013.01); *C08K 5/09* (2013.01); *C08K 5/36* (2013.01); *C08K 5/37* (2013.01); *C08L 13/02* (2013.01); *C08L 15/00* (2013.01); *A41D 19/0055* (2013.01); *C08J 2309/04* (2013.01); *C08K 5/42* (2013.01); *C08L 2312/00* (2013.01)

(58) Field of Classification Search
CPC .... C08F 236/12; C08F 222/02; C08F 220/06; C08L 9/04; C08L 15/00; C08L 13/02; C08L 2312/00; C08K 3/22; C08K 5/36; C08K 5/09; C08K 5/37; C08K 5/42; C08J 5/02; C08J 2309/04; A41D 19/0055
See application file for complete search history.

(56) References Cited

U.S. PATENT DOCUMENTS

| | | | |
|---|---|---|---|
| 8,207,276 B2 | 6/2012 | Kodama et al. | |
| 2003/0050377 A1 | 3/2003 | Hagiwara et al. | |
| 2008/0227913 A1 | 9/2008 | Koide | |
| 2009/0105424 A1 | 4/2009 | Kodama et al. | |
| 2009/0292081 A1* | 11/2009 | Suddaby .................... | C08J 3/24 525/370 |
| 2012/0149859 A1 | 6/2012 | Yang et al. | |
| 2013/0198933 A1 | 8/2013 | Khoo et al. | |
| 2014/0065336 A1 | 3/2014 | Nakashima et al. | |
| 2014/0302265 A1 | 10/2014 | Yang et al. | |
| 2015/0232637 A1 | 8/2015 | Cha et al. | |
| 2016/0244575 A1 | 8/2016 | Kim et al. | |
| 2016/0272794 A1* | 9/2016 | Han ...................... | C08L 51/003 |
| 2017/0283599 A1 | 10/2017 | Cha et al. | |

FOREIGN PATENT DOCUMENTS

| | | | |
|---|---|---|---|
| CN | 101456922 A | 6/2009 | |
| CN | 104159959 A | 11/2014 | |
| CN | 106661307 A | 5/2017 | |
| EP | 2292667 B1 | 2/2013 | |
| JP | 2009138194 A | 6/2009 | |
| JP | 2012201856 A | 10/2012 | |
| JP | 5275520 B2 | 8/2013 | |
| JP | 2014530289 A | 11/2014 | |
| KR | 20110019176 A | 2/2011 | |
| KR | 20130055334 A | 5/2013 | |
| KR | 101274865 B1 | 6/2013 | |
| KR | 20140053859 A | 5/2014 | |
| KR | 101602527 B1 | 3/2016 | |
| WO | 2006123743 A1 | 11/2006 | |
| WO | 2007004459 A1 | 1/2007 | |
| WO | 2008001764 A1 | 1/2008 | |
| WO | WO-2014142424 A1 * | 9/2014 | ................ C08L 9/04 |
| WO | 2016181410 A2 | 11/2016 | |

OTHER PUBLICATIONS

International Search Report for Application No. PCT/KR2017/012067 dated Feb. 19, 2018.
Extended European Search Report including the Written Opinion for Application No. EP 17878238.9 dated Aug. 21, 2019, pp. 1-7.
Chinese Search Report for Application No. 201780060648.X dated Sep. 10, 2020, 2 pages.

* cited by examiner

*Primary Examiner* — Robert C Boyle
(74) *Attorney, Agent, or Firm* — Lerner, David, Littenberg, Krumholz & Mentlik, LLP

(57) ABSTRACT

The present invention relates to a carboxylic acid-modified nitrile-based copolymer latex, a preparation method for producing the same, a latex composition for dip-molding comprising the same, and a molding product prepared therefrom, more particularly to a carboxylic acid-modified nitrile-based copolymer latex capable of ensuring physical properties equivalent to or better than those using sulfur and vulcanization accelerators or cross-linking agents such as zinc oxide without using them by preparing the latex so that a large amount of anionic compound is present on the surface of the latex particles, a preparation method for producing the same, a latex composition for dip-molding comprising the same, and a molding product prepared therefrom.

14 Claims, 2 Drawing Sheets

【Figure 1】
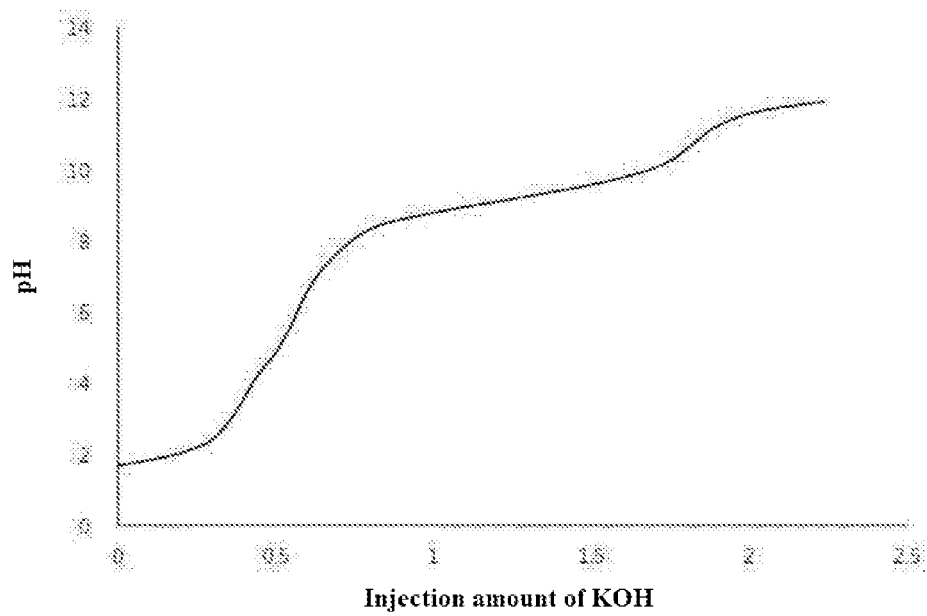

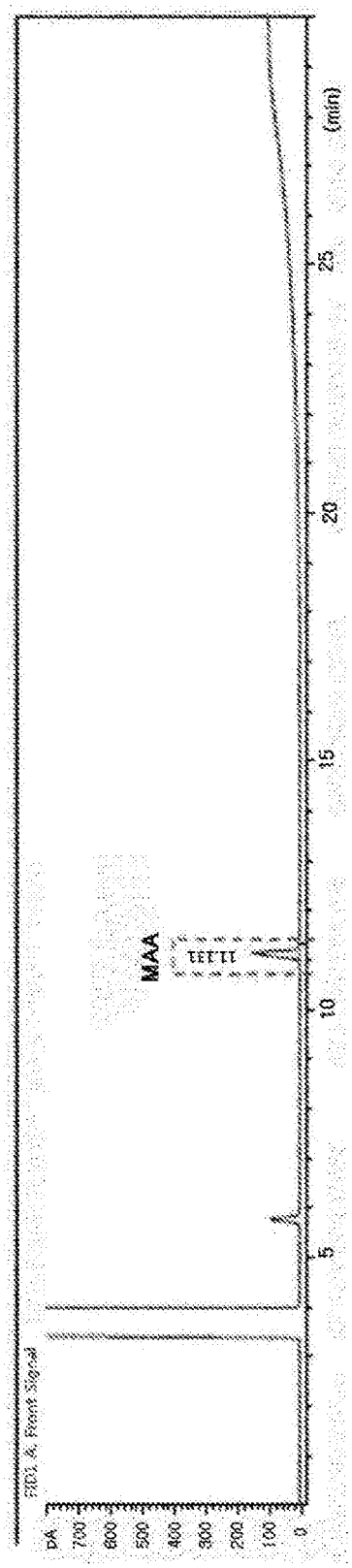

CARBOXYLIC ACID-MODIFIED NITRILE-BASED COPOLYMER LATEX AND LATEX COMPOSITION FOR DIP MOLDING COMPRISING SAME

CROSS-REFERENCE TO RELATED APPLICATIONS

This application is a national phase entry under 35 U.S.C. § 371 of International Application No. PCT/KR2017/012067, filed Oct. 30, 2017, which claims priority to Korean Patent Application No. 10-2016-0167341, filed Dec. 9, 2016, and Korean Patent Application No. 10-2017-0132671, filed Oct. 12, 2017, the disclosures of which are incorporated herein by reference.

TECHNICAL FIELD

The present invention relates to a carboxylic acid-modified nitrile-based copolymer latex capable of cross-linking by bonding an anion with a multivalent metal ion and a latex composition for dip-molding comprising the same.

BACKGROUND ART

The Rubber gloves are increasingly used in a wide range of fields such as food, electronics, and medical fields as the awareness of personal safety is increased. All the while, pain and allergy symptoms such as skin rash have been known to occur only by natural rubber gloves made by dip-molding natural rubber. However, recently, it has been reported that allergies can also be caused by sulfur cross-linked gloves made by dip-molding the synthetic latex. This is because the vulcanization accelerators (thiuram based accelerator, carbamate based accelerator) used to promote sulfur cross-linking causes symptoms such as contact dermatitis which is a delayed reaction allergy type 4. In addition, when sulfur and vulcanization accelerators are used to make gloves, curing at high temperature is required, and hydrogen sulfide, sulfur dioxide, and other low-molecular-weight mercaptans generated at this time, threaten the health of workers and cause unpleasant odors.

The zinc oxide used in cross-linking of the synthetic latex together with sulfur and vulcanization accelerators plays the role of improving the strength by forming ionic bond with the carboxylic acid of the synthetic latex, but the bond is weakened in the acid solution due to the characteristics of the ionic bond. In the food industry, acidic solutions such as vinegar acid are often handled when using gloves. At this time, there is a possibility that the zinc ion is leached by the acid solution. Accordingly, in the case of rubber gloves used in the food industry, the amount of zinc ion leached by the acid solution is regulated In order to prevent side effects by sulfur and vulcanization accelerators as described above, there have been various attempts to make rubber gloves without using them.

However, since most of these attempts are using zinc oxide, when an operation using an acid solution is performed, the metal bond between the zinc ion and the carboxylic acid is weakened as mentioned above, thereby weakening the strength and durability of the gloves. In addition, there is a possibility that the zinc ion is leached and transferred to the working material. In this case, it is difficult to obtain similar durability and chemical resistance compared to gloves made by sulfur and vulcanization accelerators.

The main components of human perspiration are ammonia, urea, and citric acid. These perspiration components can weaken the metal bond of carboxylic acid and zinc ion, and in this case, the durability of gloves is seriously degraded. In addition, the ionic bond of zinc ion other than covalent bond by sulfur cross-linking is easily broken in a polar solvent, and thus the chemical resistance of the gloves is also deteriorated.

PRIOR ART LITERATURE (Patent Literature) Korean Laid-Open Patent Publication No. 2014-0053859 (May 8, 2014), HIGHLY SATURATED NITRILE RUBBER COMPOSITION AND CROSS-LINKED RUBBER.

DISCLOSURE

Technical Problem

In order to solve the above-mentioned problems, the inventors of the present invention have found that physical properties equivalent to or better than those obtained by using sulfur and vulcanization accelerators or cross-linking agents such as zinc oxide in accordance to the prior art without using them can be ensured by preparing the latex so that a large amount of anion is present on the surface of the latex particles, in order to increase the ionic bond force, while inducing the cross-linking by ionic bond between anion and multivalent metal cation in polymerizing the latex for the rubber glove, thereby completing the present invention.

Therefore, it is an object of the present invention to provide a carboxylic acid-modified nitrile-based copolymer latex in which the content of anionic compound present on latex particle surfaces is controlled and a method for preparing the same.

In addition, another object of the present invention is to provide a latex composition for dip-molding comprising the carboxylic acid-modified nitrile-based copolymer latex.

In addition, another object of the present invention is to provide a dip-molded product which is produced from the latex composition for dip-molding and have almost no extraction of metal cations and excellent durability and chemical resistance.

TECHNICAL SOLUTION

In order to achieve the above object, the present invention provides a copolymerized carboxylic acid-modified nitrile-based copolymer latex copolymerized from components comprising a conjugated diene monomer, an ethylenically unsaturated nitrile-based monomer, an unsaturated carboxylic acid monomer, an unsaturated dicarboxylic acid monomer and a sulfur oxyanion compound, characterized in that 80 wt. % or more of the total content of the unsaturated carboxylic acid monomer, the unsaturated dicarboxylic acid monomer and the sulfur oxyanion compound is copolymerized on the surface of the latex particle.

In addition, the present invention provides a preparation method of the carboxylic acid-modified nitrile-based copolymer latex which comprises preparing the carboxylic acid-modified nitrile-based copolymer latex by polymerizing the components comprising the conjugated diene monomer, the ethylenically unsaturated nitrile-based monomer, the unsaturated carboxylic acid monomer, the unsaturated dicarboxylic acid monomer and the sulfur oxyanion compound, characterized in that at the time the polymerization conversion rate is of 10 to 50% during the polymerization, any one component of the unsaturated carboxylic acid monomer, the unsaturated dicarboxylic acid monomer, and the sulfur oxyanion compound is further injected in a divided injection method to perform copolymerization.

In addition, the present invention provides a latex composition for dip-molding characterized by including the carboxylic acid-modified nitrile-based copolymer latex; and a multivalent metal cation compound.

In addition, the present invention provides a dip-molded product characterized by being prepared by dip-molding the latex composition for dip-molding.

Advantageous Effects

The carboxylic acid-modified nitrile-based copolymer latex according to the present invention may ensure physical properties equivalent to or better than those of cross-linking by sulfur and vulcanization accelerators or cross-linking agents such as zinc oxide, through ionic bond between anion and multivalent metal ion.

Particularly, since the dip-molded product made of the latex has less than 0.1 ppm of the leaching amount of metal ion in the acid solution, such dip-molded product can not only be safely used in the food field, etc., but also can ensure excellent chemical resistance for various solvents along with high durability which is not easily torn even by perspiration. Also, since sulfur and vulcanization accelerators are not used, skin allergy problems caused by their use can be solved.

DESCRIPTION OF DRAWINGS

FIG. 1 is a graph showing the pH change according to KOH injection amount.

FIG. 2 is an analysis spectrum by GC/FID.

BEST MODE

Hereinafter, the present invention will be explained in more detail to assist the understanding thereof.

It will be understood that words or terms used in the specification and claims shall not be interpreted as limited to the meaning defined in commonly used dictionaries, and that the words or terms should be interpreted as having a meaning and concept that are consistent with the technical idea of the invention, based on the principle that an inventor may properly define the meaning of the words or terms to best explain the invention.

Carboxylic Acid-Modified Nitrile-Based Copolymer Latex

The present invention provides a carboxylic acid-modified nitrile-based copolymer latex wherein excess anions are present on the surface of the particles of the copolymer latex, thereby enabling cross-linking through ionic bonds with multivalent metal cations, and thus the physical properties equivalent to or better than those of the prior art can be ensured without using sulfur and vulcanization accelerators, which cause problems such as allergies, or zinc oxide, which is heavily leached in acidic solution.

The carboxylic acid-modified nitrile-based copolymer provided in the present invention is a copolymer obtained by copolymerization of components comprising a conjugated diene-based monomer, an ethylenically unsaturated nitrile-based monomer, an unsaturated carboxylic acid monomer, an unsaturated dicarboxylic acid monomer and a sulfur oxyanion compound.

Among the monomers constituting the copolymer, the unsaturated carboxylic acid monomer and the unsaturated dicarboxylic acid monomer contain an anion called a carboxyl group, and the sulfur oxyanion compound contains anion such as sulfate or sulfonate. In this respect, anion referred to in the present specification means a sum of carboxyl group ($COO^-$), sulfate group ($SO_3^-$) and sulfonate group ($SO_4^{2-}$). Also, monomers and compounds containing anions are collectively referred to as an 'anionic compound'.

In the carboxylic acid-modified nitrile-based copolymer according to the present invention, as the above monomers are included, it is common that when copolymerized while including the above monomers, the anions are randomly present throughout the copolymer latex particle by the monomers or sulfur oxyanion. However, the present invention characterized in that the anionic compounds having anions were present in a copolymerized state on the surface of the latex particle so that anions are concentrated on the surface of the copolymer latex particle.

The presence or absence of anionic compounds on the latex particle surface can be analyzed by methods such as titration method, acid value measurement, NMR (Nuclear magnetic resonance analysis), or FT-IR (Fourier transform infrared spectrum analysis). Among them, the acid value, NMR, and FT-IR predict only the total content of the anion compounds, and are not easy to measure the content of anionic compounds "present on the surface" to be obtained in the present invention.

Specifically, the content of the anionic compounds present on the latex particle surface is obtained by calculating the injection amount of KOH consumed to neutralize anions present in the anionic compound by the selective neutralization method, and such method proceeds as follows.

First, after the copolymer latex is diluted to 10%, 3% aqueous KOH solution is added and stirring is carried out at pH 12 for 2 hours at 90° C. The resulting diluted solution is cooled to room temperature, and 2% aqueous hydrochloric acid solution is added to adjust the pH to 2, followed by stirring at 90° C. for 2 hours. Next, the temperature of the solution is lowered to room temperature, and titrated with 3% KOH aqueous solution to calculate the content of anions bound to the particle surface. At this time, it means that the higher the value of the anion content measured by the selective neutralization method, the greater the content of anion on the surface.

The content of anionic compounds in the carboxylic acid-modified nitrile-based copolymer latex according to the present invention is measured by calculation of the amount of KOH consumed by the selective neutralization method, and 80 wt. % or more, preferably 83 wt. % or more, more preferably 85 to 99.5 wt. % of the total content of anionic compounds are present on the latex particle surface. In the present invention, the expression stating that 80 wt. % or more of 100 wt. % of all anionic compounds are 'present on the surface' of the copolymer latex particle or present 'in the copolymerized form' on the surface means that 80 wt. % or more of the total injection amount of anionic compounds having anions on the copolymer, which can form the ionic bond with multivalent metal cations at pH 9 or more, exist on the surface. If anionic compounds having anions for ionic bond are present inside the particles, even if the pH is raised, it does not bond with the multivalent metal cations due to the cross-linking of the copolymer particles. That is, if anionic compounds are not bound to the copolymer and thus are present in the serum, they will not help to increase the durability and chemical resistance of dip-molded products, even if they are bound with multivalent metal cations.

More specifically, the content of carboxylic acids present on the surface of the copolymer particle is 5 wt. % or more, and the content of residual carboxylic acid in the copolymer serum is preferably 0.1 wt. % or less.

In order for the anionic compounds of 80 wt. % or more to be present in the copolymerized form on the surface of the copolymer latex particles as described above, the type and content of each monomer used in the preparation of the carboxylic acid-modified nitrile-based copolymer should be limited and control of the process for specific preparing methods is required.

The carboxylic acid-modified nitrile-based copolymer according to the present invention is prepared via a polymerization step of the components comprising a conjugated diene-based monomer, an ethylenically unsaturated nitrile-based monomer, an unsaturated carboxylic acid monomer, a unsaturated dicarboxylic acid monomer and a sulfur oxyanion.

The conjugated diene-based monomer is at least one selected from the group consisting of 1,3-butadiene, 2,3-dimethyl-1,3-butadiene, 2-ethyl-1,3-butadiene, 1,3-pentadiene and isoprene. Among these, 1,3-butadiene is most preferably used.

The conjugated diene-based monomer is used in an amount of from 35 to 80 wt. %, preferably from 40 to 75 wt. %, more preferably from 45 to 70 wt. %, based on the total content of 100 wt. % of the total monomers constituting the carboxylic acid-modified nitrile-based copolymer. If the content is less than the above range, the dip-molded products are hardened and the feeling of wearing becomes worse. On the contrary, if the content exceeds the above range, the oil resistance of the dip-molded products is lowered and the tensile strength is lowered.

As another monomer constituting the copolymer of latex for rubber gloves according to the present invention, the ethylenically unsaturated nitrile-based monomer is at least one selected from the group consisting of acrylonitrile, methacrylonitrile, fumaronitrile, α-chloronitrile, and α-cyanoethyl acrylonitrile. Among these, acrylonitrile and methacrylonitrile are preferable, and acrylonitrile is most preferably used.

The ethylenically unsaturated nitrile-based monomer is contained in an amount of 20 to 50 wt. %, preferably 25 to 40 wt. % based on the total content of 100 wt. % of the total monomers constituting the carboxylic acid-modified nitrile-based copolymer. If the content of the ethylenically unsaturated nitrile-based monomer is less than the above range, not only the oil resistance of the dip-molded products is lowered but also the tensile strength is lowered. On the contrary, if the content exceeds the above range, there arise problem that the dip-molded products are hardened and the feeling of wearing becomes worse.

In particular, the copolymer latex of the present invention has an excess of anions on the surface, and the anions are originated from the unsaturated carboxylic acid monomer and the unsaturated dicarboxylic acid monomer.

The unsaturated carboxylic acid monomer is any one of acrylic acid and methacrylic acid, preferably methacrylic acid.

The unsaturated carboxylic acid monomers are contained in an amount of 2 to 10 wt. %, preferably 4 to 7 wt. % based on the total content of 100 wt. % of the total monomers constituting the carboxylic acid-modified nitrile-based copolymer. If the content of the unsaturated carboxylic acid monomer is less than the above range, the tensile strength of the dip-molded products is lowered. On the contrary, if the content exceeds the above range, the dip-molded products are hardened and the feeling of wearing becomes worse.

The unsaturated dicarboxylic acid monomer may be at least one selected from the group consisting of itaconic acid, maleic acid, fumaric acid and glutaconic acid, preferably itaconic acid or fumaric acid.

The unsaturated dicarboxylic acid monomer is used in an amount of 0.1 to 3.0 wt. %, more preferably 0.5 to 2.5 wt. % based on the total content of 100 wt. % of the total monomers constituting the carboxylic acid-modified nitrile-based copolymer. The unsaturated dicarboxylic acid monomer plays a role of strengthening the bonding with multivalent metal cations for cross-linking and also plays a role of increasing the durability and chemical resistance of the dip-molded products. Therefore, if the content is less than the above range, the effect of improving the physical properties of the dip-molded products cannot be expected. On the contrary, if the content exceeds the above range, there arises a problem that the dip-molded products are hardened.

The sulfur oxyanion compound is a compound that contains sulfur and oxygen in the molecular structure, and means a compound having sulfate group ($SO_3^-$) or sulfonate group ($SO_4^{2-}$) in the molecular structure. The sulfur oxyanion compound is present in the copolymer latex and has a strong anionic property on the surface, and thus plays a role of strengthening the ionic bond with the multivalent metal cation added for cross-linking due to the anionic property.

All these sulfur oxyanion compounds can be used as long as they are compounds having a sulfate group or a sulfonate group in the molecular structure, as mentioned above. However, since the sulfur oxyanion compound should not affect the physical properties of the final dip-molded products, the sulfur oxyanion compound may be any one selected from the group consisting of persulfate initiator, sodium allyl sulfonate and sodium styrene sulfonate. Examples of the persulfate initiator include sodium persulfate, potassium persulfate, and ammonium persulfate. When these initiators are used, sodium allyl sulfonate or sodium styrene sulfonate can be excluded. In addition, when sodium allyl sulfonate or sodium styrene sulfonate is used, it is possible to use potassium perphosphate or hydrogen peroxide other than the persulfate-based initiators as an initiator.

In order to achieve the above-mentioned effect, the sulfur oxyanion compound is added in an amount of 0.1 to 2.0 parts by weight, more preferably 0.5 to 1.7 parts by weight relative to 100 parts by weight of the total content of monomers constituting the carboxylic acid-modified nitrile-based copolymer. Thus, if the content is less than the above range, the effect of improving the physical properties of the dip-molded products cannot be expected. On the contrary, if the content exceeds the above range, there arises a problem that the dip-molded products are hardened.

The carboxylic acid-modified nitrile-based copolymer latex of the present invention can be prepared by emulsion polymerization by adding an emulsifier, a polymerization initiator, and a molecular weight modifier, etc. to the monomers constituting the carboxylic acid-modified nitrile-based copolymer as already mentioned above.

However, in order to increase the content of the anionic compounds on the copolymer latex particle surface, the manner of addition of the anionic compounds is controlled in the polymerization process. That is, the anionic compounds having anionic group are unsaturated carboxylic acid monomers, unsaturated dicarboxylic acid monomers and sulfur oxyanion compounds, and a part of the total amount of these is added partly at a time point between 10% and 50% of the polymerization conversion rate after the progress of the polymerization so that they are intensively distributed on the copolymer latex surface.

Specifically, carboxylic acid-modified nitrile-based copolymer latex is prepared by the steps comprising, (a) adding a conjugated diene-based monomer, an ethylenically unsaturated nitrile-based monomer, an unsaturated carboxylic acid monomer, an unsaturated dicarboxylic acid monomer and a sulfur oxyanion compound, an emulsifier, a polymerization initiator and deionized water to a reactor, (b) performing an emulsion polymerization, (c) further injecting a portion of the total injection amount of at least one anionic compound selected from the group of the unsaturated carboxylic acid monomer, the unsaturated dicarboxylic acid monomer and the sulfur oxyanion compound in a divided injection method at the time point of the polymerization conversion ratio of between 10% and 50% after the progress of the polymerization, and (d) continuing and then terminating the polymerization.

Each step will be described in detail below.

First, the emulsion polymerization is carried out by adding the conjugated diene-based monomer, the ethylenically unsaturated nitrile-based monomer, the unsaturated carboxylic acid monomer, the unsaturated dicarboxylic acid monomer and the sulfur oxyanion compound, the emulsifier, the molecular weight modifier and the polymerization initiator into deionized water (step a).

The composition of the conjugated diene-based monomer, the ethylenically unsaturated nitrile-based monomer, the unsaturated carboxylic acid monomer, the unsaturated dicarboxylic acid monomer, and the sulfur oxyanion compound is as described above.

The emulsifier may be any emulsifier as long as it is used in ordinary emulsion polymerization, and is not particularly limited in the present invention. As an example, the emulsifier may be anionic surfactants or non-ionic surfactants. Among these, the anionic surfactants selected from the group consisting of alkylbenzenesulfonic acid salts, aliphatic sulfonic acid salts, sulfuric acid ester salts of higher alcohols, α-olefin sulfonic acid salts and alkyl ether sulfuric acid ester salts are particularly preferably used.

The emulsifier is preferably used in an amount of 0.3 to 10 parts by weight, more preferably 0.8 to 8 parts by weight, most preferably 1.5 to 6 parts by weight, relative to 100 parts by weight of the total monomers constituting the carboxylic acid-modified nitrile-based copolymer. If the content of emulsifier is less than the above range, the stability at the time of polymerization is lowered. On the contrary, if the content exceeds the above range, there is a problem that it is difficult to prepare the dip-molded product due to the occurrence of a large amount of foam.

As the polymerization initiator, one initiator selected from inorganic peroxides such as sodium persulfate, potassium persulfate, ammonium persulfate, potassium perphosphate, and hydrogen peroxide can be used.

The amount of the polymerization initiator used is 0.01 to 2 parts by weight, more specifically 0.02 to 1.5 part by weight, relative to 100 parts by weight of the total monomers constituting the carboxylic acid-modified nitrile-based copolymer. If the amount of the polymerization initiator is less than 0.01 part by weight, the polymerization rate is lowered and thus the final product is difficult to produce. If the amount of the polymerization initiator exceeds 2 parts by weight, the polymerization rate becomes too fast and the polymerization rate cannot be controlled.

The molecular weight modifier is not particularly limited, and for example, may include α-methylstyrene dimers, mercaptans such as t-dodecyl mercaptan, n-dodecyl mercaptan and octyl mercaptan; halogenated hydrocarbons such as carbon tetrachloride, methylene chloride and methylene bromide; and sulfur-containing compounds such as tetraethylthiuram disulfide, dipentamethylenethiuram disulfide and diisopropylxanthogene disulfide.

These molecular weight modifiers may be used alone or in combination of two or more.

Among these, mercaptans are preferable, and t-dodecyl mercaptan may be more preferably used. The amount of the molecular weight modifier used varies depending on the kind thereof, but may be preferably 0.1 to 2.0 parts by weight, more preferably 0.2 to 1.5 parts by weight, most preferably 0.3 to 1.0 part by weight, relative to 100 parts by weight of the total monomers constituting the carboxylic acid-modified nitrile based copolymer. If the amount of the molecular weight modifier is less than 0.1 part by weight, the physical properties of the dip-molded products are significantly deteriorated. If the amount of the molecular weight modifier exceeds the above range, there is a problem that the polymerization stability is lowered.

Deionized water is used as a medium for emulsion polymerization.

In addition to the above composition, if necessary, the conventional additives used in emulsion polymerization of latex resins may further be included. As an example, the additives may be activator, chelating agent, dispersing agent, pH adjusting agent, deoxidizing agent, particle diameter adjusting agent, anti-aging agent, or oxygen scavenger.

In the present step (a), the monomers, the emulsifier, the molecular weight modifier, the polymerization initiator and further additives can be added simultaneously or continuously into the reactor. Appropriate methods can be selected by those of ordinary skill in the art.

Next, the emulsion polymerization of the mixed mixture is performed (step b).

The polymerization temperature during the emulsion polymerization may be generally from 10 to 90° C., preferably from 20 to 80° C., more preferably 25 to 75° C., but is not particularly limited.

Next, any one selected from the group consisting of the unsaturated carboxylic acid monomer, the unsaturated dicarboxylic acid monomer and the sulfur oxyanion compound is injected in a divided injection method under the condition below a constant polymerization conversion rate after the progress of the polymerization (step c).

The divided injection is carried out at a rate of 30 wt % or less of the total amount of each monomer, and the anionic compounds can be present in a large amount on the surface of the copolymer latex particle through the divided injection method. In the divided injection method, the remaining monomers may be added all at once or continuously, or all the contents may be added to the polymerization reactor at a time, or a part of the contents may be added to the polymerization reactor and then the remaining contents may be continuously supplied to the polymerization reactor Particularly, the divided injection is performed at a polymerization conversion rate of 50% or less, preferably 10 to 50%.

The polymerization conversion rate of the polymerization reaction can be measured by a method commonly known in the art. For example, a certain amount of sample was sampled from the reaction composition at constant time intervals, and the solid content was measured, and then, the polymerization conversion ratio was calculated by the following equation (1).

Polymerization conversion rate (%)=(Ms−Mo)/(Mp−M'o)  (Equation 1)

wherein Ms is the weight of the dried copolymer latex,
Mo is the sum of the weights of the emulsifier and the initiator,
Mp is the weight of 100% polymerized polymer,
M'o is the sum of the weight of the emulsifier and the initiator.

The addition of a portion of the anionic compound before the polymerization conversion rate of 10% is no different from the initial introduction of the anionic compound. When added after a polymerization conversion rate of 50% or more, since the anionic compound is not copolymerized into the copolymer, the amount of unreacted anionic compound detected in the serum increases The amount of anionic compound added at this time is suitably 30 wt % or less of the total injection amount. If the amount is more than this amount, there is a possibility that the amount of the unreacted anionic compound detected in the serum may increase, or the stability of the polymerization reaction may deteriorate.

Next, the polymerization reaction is terminated to obtain a copolymer latex for rubber gloves (step d)

The termination of the polymerization reaction is carried out after a polymerization conversion ratio of not less than 90%, preferably not less than 93%. The termination of the polymerization reaction is carried out by adding a polymerization inhibitor, a pH adjusting agent and an antioxidant.

The copolymer latex finally obtained after the termination of the reaction is used after removing unreacted monomers through usual deodorization and concentration process.

The carboxylic acid-modified nitrile-based copolymer latex has a glass transition temperature of −40 to −15° C., preferably −35 to −20° C. If the glass transition temperature of the latex is less than the above range, the tensile strength is significantly lowered and the feeling of wearing is deteriorated due to stickiness of the gloves. On the contrary, if the glass transition temperature is higher than the above range, cracks of the dip-molded products occur, this is not preferable. The glass transition temperature can be adjusted by controlling the content of the conjugated diene monomer and can be measured by Differential Scanning Calorimetry The average particle size of the latex for dip-molding may be 80 nm to 300 nm. If the average particle size of the latex for dip-molding falls within the above range, the tensile strength of the produced dip-molded products can be improved.

The average particle size of the latex for dip-molding can be adjusted by adjusting the type or content of the emulsifier, and the average particle size can be measured with a Laser Scattering Analyzer (Nicomp).

Carboxylic Acid-Modified Nitrile-Based Copolymer Latex Composition

The carboxylic acid-modified nitrile-based copolymer latex according to the present invention as mentioned above can be used as a latex composition for dip-molding as it is, or can be used to produce a latex composition for dip-molding through the addition of commonly used composition (or additives) in the preparation of dip-molded products.

Particularly, the latex composition for dip-molding according to the present invention uses a multivalent metal cation compound to enable ionic bond (i.e., cross-linking) with a carboxyl group present in a large amount on the copolymer latex particle surface, in order to enable cross-linking without the use of a sulfur and vulcanization accelerator or a cross-linking agent such as zinc oxide.

The multivalent metal cation compound may be any one of the salts of trivalent or more metal cation such as aluminum hydroxide, aluminum sulfate, aluminum chloride, aluminum lactate, aluminum acetylacetonate and the like, preferably aluminum acetylacetonate.

The multivalent metal cation compound can increase the durability and chemical resistance of the dip-molded products by generating ionic bonds with the carboxyl groups present in large amounts on the copolymer latex particle surface. As a result, the content of the multivalent metal cation compound is used in an amount of 0.1 to 5 parts by weight, preferably 0.5 to 4 parts by weight, relative to 100 parts by weight of the carboxylic acid-modified nitrile-based copolymer latex. If the content is less than the above range, the durability and chemical resistance are lowered and thus problems such as tearing occur during use. If the content is used in an excessive amount departing from the above range, there is a possibility that it is hardened.

As described above, the mechanism of cross-linking by ionic bond between anion and metal cation weakens its bonds in acidic solutions, perspiration and polar solvents due to their characteristics. Particularly, dip-molded products such as gloves are often used to treat acidic solutions such as vinegar acid in food or chemistry, where metal cations are leached by the acidic solution. In particular, when zinc oxide is used as a cross-linking agent, the amount of leached zinc ion is substantially regulated. In addition, the bond can be weakened by the main component of the perspiration of the person, and then the bond easily breaks in the polar solvent, and thus the chemical resistance of the products can be lowered.

The latex composition for dip-molding according to the present invention is cross-linked by using an aluminum-based multivalent metal cation compound instead of zinc oxide as a cross-linking agent, and the dip-molded products thus produced have minimal leaching content when immersed in acidic solutions, and have good chemical resistance along with high durability against perspiration.

The leaching of metal cations is quantified by analyzing the content of metal cations in the leaching solution by the inductively coupled plasma optical emission spectrometry (ICP-OES) after immersing in an acid solution of known concentration for a certain period of time. At this time, it means that the lower the value, the less content of leached metal cations.

The extraction solution is obtained by cutting the dip-molded products to an area of 10*10 cm 2, immersing them in 200 g of 4% aqueous acetic acid solution, and extracting at 60° C. for 30 minutes. The dip-molded products according to the present invention produced by this method satisfy the requirement that the aluminum ion extracted from the acid solution is less than 0.1 ppm. These values indicate that the ionic bond strength between anion and metal cation is very high, and even when used acidic solutions such as vinegar, the content of leached metals is very low.

Also, as a result of measuring the time until tearing after wearing the dip-molded products in the form of gloves in the hand, the durability against perspiration could be maintained even when wearing continuously for 4 hours or more. Additionally, in case of the chemical resistance, it was measured according to EN374-3: 2003, and hexane was used as penetration solvent, and as a result, excellent results over 40 minutes were obtained.

The latex composition for dip-molding capable of cross-linking by ionic bonds between anions and metal cations, which ensures excellent effects, as described above, may further include various additives for the preparation of various products in addition to the multivalent metal cationic compound.

As the additives, additives, which is used in dip-molding, such as a pigment such as titanium dioxide, a filler such as silica, a thickener, a pH adjusting agent such as ammonia or an alkali hydroxide may be used.

Furthermore, the latex composition for dip-molding according to the present invention has a solid concentration of 5 to 40 wt. %, preferably 8 to 35 wt. %, more preferably 10 to 33 wt. %. If the concentration is too low, the transport efficiency of the latex composition may be lowered. If the concentration is too high, the solid concentration may cause an increase in viscosity and thus cause problems such as storage stability. Therefore, the concentration is appropriately adjusted within the above range.

In addition, the pH of the latex composition for dip-molding may be from 9 to 12, preferably from 9 to 11, more preferably from 9.5 to 10.5.

In addition, the pH of the latex composition according to the present invention can be adjusted by adding a certain amount of a pH adjusting agent. As the pH adjusting agent, 1 to 5% aqueous potassium hydroxide solution or 1 to 5% aqueous ammonia may mainly be used.

Dip-Molded Products

In addition, the present invention provides dip-molded products made from the above latex composition for dip-molding.

As already mentioned above, the latex composition for dip-molding can be cross-linked only by ionic bonds of anions and multivalent metal cations, and possesses physical properties equivalent to or better than those of the dip-molded products by sulfur and vulcanization accelerators or a cross-linking agents such as zinc oxide, particularly the durability and the chemical resistance directly related to cross-linking, and the latex composition for dip-molding has a leaching fraction of multivalent metal cations of less than 0.1 ppm in acid solution.

A typical method may be used as a dip-molding method for obtaining the dip-molded products of the present invention. Examples thereof may include a direct immersion method, an anode adhesion immersion method, and a Teague adhesion immersion method. Among the examples, the anode adhesion immersion method is preferable because of an advantage that a dip-molded product having a uniform thickness may be easily obtained.

The preparation method of the dip-molded product using the composition of the present invention includes the steps comprising, (a) coating the surface of the mold with a coagulant solution;

(b) coating the coagulant coated mold with a latex composition for dip-molding to form a dip-molding layer;

(c) cross-linking the dip-molding layer; and (d) peeling the cross-linked dip-molding layer from the mold to obtain a dip-molded product.

Hereinafter, a preparation method of a dip-molded product using the latex composition of the present invention will be described in detail.

(a) Step of Coating the Surface of the Mold with the Coagulant

In this step (a), a hand-shaped dip-molding frame is used as a mold, and a process of coating the surface of the mold with a coagulant is performed by coating the mold with a coagulant solution and drying it Examples of the coagulant include metal halides such as barium chloride, calcium chloride, magnesium chloride, and zinc chloride; nitrates such as barium nitrate, calcium nitrate, and zinc nitrate; acetates such as barium acetate, calcium acetate, and zinc acetate; and sulfates such as calcium sulfate and magnesium sulfate. Among these, calcium chloride and calcium nitrate are preferable. The coagulant solution is a solution wherein the coagulant as mentioned above is dissolved in water, alcohol, or a mixture thereof. The concentration of the coagulant in the coagulant solution is normally 5 to 50 wt. %, preferably 10 to 40 wt. %.

(b) Step of Forming the Dip-Molding Layer in the Mold

In the step (b) subsequent to the step (a), a step of forming the dip-molding layer is performed by immersing the mold, to which the coagulant is attached, in the latex composition for dip-molding according to the present invention to form the dip-molding layer.

The mold to which the coagulant is attached is immersed in the latex composition for the rubber gloves of the present invention and then the mold is taken out to form the dip-molding layer in the mold.

(c) Step of Cross-Linking the Dip-Molding Layer

Next, in the present step (c), a step of cross-linking the latex resin is performed by heat-treating the dip-molding layer formed on the mold.

The cross-linking is carried out through heat treatment. At this time, the water component first evaporates during the heat treatment, and curing is carried out through the cross-linking.

(d) Steps of Obtaining the Dip-Molded Product and Measuring Physical Properties thereof Next, in the present step (d), the dip-molded product is obtained from the mold and the physical properties of the obtained dip-molded product are measured.

A dumbbell-shaped specimen was produced from the obtained dip-molded product in accordance with ASTM D-412. Subsequently, the specimen is pulled at a stretching speed of 500 mm/min using a Universal Testing Machine (UTM), the tensile strength and elongation at break are measured, and the tactile sensation is measured by the stress when the elongation is 300% and 500%.

The method according to the invention can be used for any latex article which can be prepared by the known dip-molding method. The method according to the present invention is particularly applicable to dip-molding latex articles selected from surgical gloves, test gloves, condoms, catheters or health care products such as various kinds of industrial and household gloves.

Most preferably, the gloves produced according to the present invention can be used as household or industrial gloves, and are particularly desirable as gloves for use in the food industry. The gloves have a leaching of metal cations of less than 0.1 ppm, when exposed to an acidic solution, and thus not only are safe to use but also have a soft feel, and since sulfur and vulcanization accelerators are not used, allergies caused by these do not originally occur. In addition, there is an advantage that the durability against perspiration is excellent, and the chemical resistance against various organic solvents is high.

Hereinafter, exemplary embodiments of the present invention will be described in order to facilitate understanding of the present invention. However, it will be apparent to those skilled in the art that the following examples are illustrative of the present invention and various changes and modifications can be made within the scope and spirit of the present invention, and such changes and modifications are intended to fall within the scope of the appended claims.

EXAMPLES

Example 1

(1) Preparation of the Copolymer Latex for the Rubber Glove

To a polymerization reactor, a mixture of monomers consisting of 32 wt. % of acrylonitrile, 61.5 wt. % of 1,3-butadiene, 4.5 wt. % of methacrylic acid and 1 wt. % of itaconic acid, and 0.7 part by weight of t-dodecylmercaptan, 2 parts by weight of sodium dodecylbenzene sulfonate, 0.3 part by weight of potassium persulfate, and 140 parts by weight of water relative to 99 parts by weight of the mixture of the above monomers were added, and then the polymerization was initiated at a temperature of 36° C.

When the polymerization conversion rate was 30%, 1.0 wt. % of methacrylic acid was added.

When the polymerization conversion rate reached 94%, the polymerization was stopped by the addition of 0.3 part by weight of ammonium hydroxide. Thereafter, the unreacted material was removed through deodorization process and ammonia water, antioxidant and defoaming agent were added to obtain a copolymer latex for the rubber glove having a solid concentration of 45% and pH 8.5.

(2) Preparation of the Dip-Molded Product

To 100 parts by weight of the latex, 2.0 parts by weight of potassium hydroxide solution, 1.0 part by weight of aluminum acetylacetonate, 1.0 parts by weight of titanium oxide (BOSTEX 497D) and the secondary distilled water were added to obtain a composition for dip-molding at a solid concentration of 20% and pH 10.

Separately, 15 parts by weight of calcium nitrate, 84.5 parts by weight of water, and 0.5 part by weight of wetting agent (Teric 320 produced by Huntsman Corporation, Australia) were mixed to form a coagulant solution. A hand-shaped ceramic mold was immersed in this solution for 20 seconds, and then taken out and dried at 70° C. for 3 minutes to apply the coagulant onto the hand-shaped mold.

Next, the coagulant-applied mold was immersed in the composition for dip-molding for 20 seconds, pulled up, dried at 70° C. for 2 minutes, and immersed in water or hot water for 3 minutes for leaching. The mold was again dried at 70° C. for 3 minutes and then cross-linked at 130° C. for 20 minutes. The cross-linked dip-molding layer was stripped from the hand-shaped mold to obtain a glove-shaped dip-molded product.

Example 2

To a polymerization reactor, a mixture of monomers consisting of 32 wt. % of acrylonitrile, 61.5 wt. % of 1,3-butadiene, 5.0 wt. % of methacrylic acid and 0.5 wt. % of fumaric acid, and 0.7 part by weight of t-dodecylmercaptan, 2 parts by weight of sodium dodecylbenzene sulfonate, 0.3 part by weight of potassium persulfate, and 140 parts by weight of water relative to 99 parts by weight of the mixture of the above monomers were added, and then the polymerization was initiated at a temperature of 36° C.

When the polymerization conversion rate was 20%, 1.0 wt. % of sodium allyl sulfate was added.

When the polymerization conversion rate reached 94%, the polymerization was stopped by the addition of 0.3 part by weight of ammonium hydroxide. Thereafter, the unreacted material was removed through deodorization process and ammonia water, antioxidant and defoaming agent were added to obtain a copolymer latex for the rubber glove having a solid concentration of 45% and pH 8.5. The latex thus obtained was used to prepare a dip-molded product by the same method as in Example 1.

Example 3

To a polymerization reactor, a mixture of monomers consisting of 34 wt. % of acrylonitrile, 60 wt. % of 1,3-butadiene, 4.0 wt. % of methacrylic acid and 0.5 wt. % of fumaric acid, and 0.7 part by weight of t-dodecylmercaptan, 2 parts by weight of sodium dodecylbenzene sulfonate, 0.3 part by weight of potassium persulfate, and 140 parts by weight of water relative to 98.5 parts by weight of the mixture of the above monomers were added, and then the polymerization was initiated at a temperature of 36° C.

When the polymerization conversion rate was 20%, 1.5 wt. % of methacrylic acid was added.

When the polymerization conversion rate reached 94%, the polymerization was stopped by the addition of 0.3 part by weight of ammonium hydroxide. Thereafter, the unreacted material was removed through deodorization process and ammonia water, antioxidant and defoaming agent were added to obtain a copolymer latex for the rubber glove having a solid concentration of 45% and pH 8.5. The latex thus obtained was used to prepare a dip-molded product by the same method as in Example 1.

Example 4

To a polymerization reactor, a mixture of monomers consisting of 33 wt. % of acrylonitrile, 61 wt. % of 1,3-butadiene, 4.0 wt. % of methacrylic acid and 0.5 wt. % of itaconic acid and 0.5 part by weight of sodium dodecylbenzene sulfonate, 0.7 part by weight of t-dodecylmercaptan, 2 parts by weight of sodium dodecylbenzene sulfonate, 0.3 part by weight of potassium persulfate, and 140 parts by weight of water relative to 99 parts by weight of the mixture of the above monomers were added, and then the polymerization was initiated at a temperature of 36° C.

When the polymerization conversion rate was 40%, 1.0 wt. % of methacrylic acid was added.

When the polymerization conversion rate reached 94%, the polymerization was stopped by the addition of 0.3 part by weight of ammonium hydroxide. Thereafter, the unreacted material was removed through deodorization process and ammonia water, antioxidant and defoaming agent were added to obtain a copolymer latex for the rubber glove having a solid concentration of 45% and pH 8.5. The latex thus obtained was used to prepare a dip-molded product by the same method as in Example 1.

Example 5

To a polymerization reactor, a mixture of monomers consisting of 33 wt. % of acrylonitrile, 60.5 wt. % of 1,3-butadiene, 5 wt. % of methacrylic acid and 0.5 wt. % of sodium allyl sulfate, and 0.7 part by weight of t-dodecylmercaptan, 2 parts by weight of sodium dodecyl benzenesulfonate, 0.3 part by weight of potassium persulfate, and 140 parts by weight of water relative to 99 parts by weight of the mixture of the above monomers were added, and then the polymerization was initiated at a temperature of 36° C.

When the polymerization conversion rate was 30%, 1.0 wt. % of itaconic acid was added.

When the polymerization conversion rate reached 94%, the polymerization was stopped by the addition of 0.3 part by weight of ammonium hydroxide. Thereafter, the unreacted material was removed through deodorization process and ammonia water, antioxidant and defoaming agent were added to obtain a copolymer latex for the rubber glove having a solid concentration of 45% and pH 8.5. The latex thus obtained was used to prepare a dip-molded product by the same method as in Example 1.

Example 6

To a polymerization reactor, a mixture of monomers consisting of 33 wt. % of acrylonitrile, 60.5 wt. % of 1,3-butadiene, 5 wt. % of methacrylic acid and 0.5 wt. % of sodium allyl sulfate, and 0.7 part by weight of t-dodecylmercaptan, 2 parts by weight of sodium dodecyl benzenesulfonate, 0.3 part by weight of potassium persulfate, and 140 parts by weight of water relative to 99 parts by weight of the mixture of the above monomers were added, and then the polymerization was initiated at a temperature of 36° C.

When the polymerization conversion rate was 40%, 1.0 wt. % of fumaric acid was added.

When the polymerization conversion rate reached 94%, the polymerization was stopped by the addition of 0.3 part by weight of ammonium hydroxide. Thereafter, the unreacted material was removed through deodorization process and ammonia water, antioxidant and defoaming agent were added to obtain a copolymer latex for the rubber glove having a solid concentration of 45% and pH 8.5. The latex thus obtained was used to prepare a dip-molded product by the same method as in Example 1.

Comparative Example 1

To a polymerization reactor, a mixture of monomers consisting of 24.5 wt. % of acrylonitrile, 72 wt. % of 1,3-butadiene, 3.5 wt. % of methacrylic acid, and 0.5 part by weight of t-dodecylmercaptan, 2 parts by weight of sodium dodecyl benzenesulfonate, 0.3 part by weight of potassium persulfate, and 140 parts by weight of water relative to 100 parts by weight of the mixture of the above monomers were added, and then the polymerization was initiated at a temperature of 40° C.

When the polymerization conversion rate reached 94%, the polymerization was stopped by the addition of 0.3 part by weight of ammonium hydroxide. Thereafter, the unreacted material was removed through deodorization process and ammonia water, antioxidant and defoaming agent were added to obtain a copolymer latex for the rubber glove having a solid concentration of 45% and pH 8.5. The latex thus obtained was used to prepare a dip-molded product by the same method as in Example 1.

Comparative Example 2

To a polymerization reactor, a mixture of monomers consisting of 30 wt. % of acrylonitrile, 65 wt. % of 1,3-butadiene and 4.0 wt. % of methacrylic acid, and 0.5 part by weight of t-dodecylmercaptan, 2 parts by weight of sodium dodecyl benzenesulfonate, 0.3 part by weight of potassium persulfate, and 140 parts by weight of water relative to 99 parts by weight of the mixture of the above monomers were added, and then the polymerization was initiated at a temperature of 40° C.

When the polymerization conversion rate was 60%, 1.0 wt. % of methacrylic acid was added.

When the polymerization conversion rate reached 94%, the polymerization was stopped by the addition of 0.3 part by weight of ammonium hydroxide. Thereafter, the unreacted material was removed through deodorization process and ammonia water, antioxidant and defoaming agent were added to obtain a copolymer latex for the rubber glove having a solid concentration of 45% and pH 8.5. The latex thus obtained was used to prepare a dip-molded product by the same method as in Example 1.

Comparative Example 3

To a polymerization reactor, a mixture of monomers consisting of 30 wt. % of acrylonitrile, 62 wt. % of 1,3-butadiene and 6.0 wt. % of methacrylic acid, and 0.5 part by weight of t-dodecylmercaptan, 2 parts by weight of sodium dodecyl benzenesulfonate, 0.3 part by weight of potassium persulfate, and 140 parts by weight of water relative to 100 parts by weight of the mixture of the above monomers were added, and then the polymerization was initiated at a temperature of 40° C.

When the polymerization conversion rate reached 94%, the polymerization was stopped by the addition of 0.3 part by weight of ammonium hydroxide. Thereafter, the unreacted material was removed through deodorization process and ammonia water, antioxidant and defoaming agent were added to obtain a copolymer latex for the rubber glove having a solid concentration of 45% and pH 8.5.

To 100 parts by weight of the latex, 1.8 parts by weight of the potassium hydroxide solution, 1.5 parts by weight of sulfur (BOSTEX378, Akron dispersions), 1.5 parts by weight of zinc oxide(BOSTEX422), 0.7 part by weight of vulcanization accelerator (BOSTEX 497B), 1.0 part by weight of titanium oxide (BOSTEX 497D) and the secondary distilled water were added to obtain a composition for dip-molding having a solid concentration of 20% and pH 10. Using this composition, a dip-molded product was prepared in the same method as in Example 1.

Comparative Example 4

To a polymerization reactor, a mixture of monomers consisting of 24 wt. % of acrylonitrile, 72 wt. % of 1,3-butadiene and 4.0 wt. % of methacrylic acid, and 0.5 part by weight of t-dodecylmercaptan, 2 parts by weight of sodium dodecyl benzenesulfonate, 0.3 part by weight of potassium persulfate, and 140 parts by weight of water relative to 100 parts by weight of the mixture of the above monomers were added, and then the polymerization was initiated at a temperature of 40° C.

When the polymerization conversion rate reached 94%, the polymerization was stopped by the addition of 0.3 part by weight of ammonium hydroxide. Thereafter, the unreacted material was removed through deodorization process and ammonia water, antioxidant and defoaming agent were added to obtain a copolymer latex for the rubber glove having a solid concentration of 45% and pH 8.5.

To 100 parts by weight of the latex, 1.8 parts by weight of the potassium hydroxide solution, 2.0 parts by weight of zinc oxide(BOSTEX422), 1.0 part by weight of titanium oxide (BOSTEX 497D) and the secondary distilled water were added to obtain a composition for dip-molding having a solid concentration of 20% and pH 10. Using this composition, a dip-molded product was prepared in the same method as in Example 1.

Experimental Example 1

Measurement of the Physical Properties Of The Latex and the Physical Properties of the Dip-Molded Product 1. Measurement of the Physical Properties of the Copolymer Latex The physical properties of the copolymer latex prepared in the above Examples and Comparative Examples were measured as follows and the results are shown in Tables 1 to 2 below.

(Distribution of Carboxylic Acid in Copolymer)

In order to determine the distribution of anions present on the surface of copolymer particles, Carboxylic acid which is a representative anion was quantified.

The latex obtained by polymerization was diluted to 10%, the pH was raised to 12 with 3% aqueous solution of potassium hydroxide, and the mixture was stirred at 90° C. for 2 hours. After the ammonia in the aqueous solution was removed, the resulting diluted solution was cooled to room temperature, the pH was lowered to 2 or less by using an aqueous hydrochloric acid solution, which was diluted to 2%, and then stirred at 90° C. for 2 hours. Next, the carbon dioxide in the aqueous solution was removed, and the resulting diluted solution was cooled to room temperature and titrated with an aqueous potassium hydroxide solution having a concentration of exactly 3% to calculate the amount of carboxylic acid bound to the surface of the particle.

FIG. 1 is a graph showing the pH change depending on the injection amount of KOH wherein the amount of carboxylic acid calculated by the injection amount of KOH between the first inflection point and the second inflection point in FIG. 1 is the amount of acid present on the surface.

Here, in the following Table 1 and Table 2, the content present on the surface means the content of the anion compound. The content of the anion compound assumes that all of the sulfur oxyanion is present on the surface (even when the pH is low, because sulfur oxyanion is dissociated with low pKa, it is present on the surface), and the content of anion present on the surface was calculated from the amount of carboxylic acid on the surface calculated by the titration method/total injection amount of carboxylic acid.

(Analysis of the Amount of Carboxylic Acid Remaining in the Latex Serum)

In order to quantify the content of anions present in the latex serum rather than on the surface of copolymer particles, the carboxylic acid which is a representative anion was quantified To 1 g of sample, 4 ml of acetonitrile was added and precipitated, and then centrifugation was performed. The supernatant was collected and analyzed by GC/FID to quantify the amount of carboxylic acid remaining in the serum in the unreacted state without binding to the copolymer.

FIG. 2 shows the analytical spectrum of GC/FID (gas chromatograph (GC)/flame ionization detector (FID)) wherein the amount of carboxylic acid remaining in the serum can be determined.

2. Measurement of the Physical Properties of the Dip-Molded Product

The physical properties of the dip-molded products prepared in the above Examples and Comparative Examples were measured as follows, and the results are shown in Tables 1 to 2 below.

(Thickness)

The thickness was measured using a Digital Thickness Meter.

(Tensile strength, elongation, modulus)

Dumbbell-shaped specimens were prepared from dip-molded products according to ASTM D-412. Subsequently, the specimens were pulled at a stretching speed of 500 mm/min, and modulus (stress) at an elongation of 300%, tensile strength and elongation at break were measured.

(Analysis of Amount of Metal Cation Extracted from Acid Solution)

The dip-molded product was cut to a size of 100 cm$^2$, and then put into 200 g of 4% acetic acid solution and extracted at 60° C. for 30 minutes. The amount of metal cation present in the solution was determined by analyzing the leaching solution by ICP-OES (inductively coupled plasma optical emission spectrometry).

(Measurement Method of Durability)

A glove-shaped dip-molded product was prepared and then was worn on the hand and measured for how much time it did not tear.

(Measurement Method of Chemical Resistance)

Measurement of the chemical resistance from the dip-molded product is carried out in accordance with EN374-3:2003.

Specimens are prepared according to EN374-3:2003. The chemical resistance was determined by contacting specimens with hexane which is a chemical substance to be measured contained in a laboratory vessel having a diameter of 51 mm and a depth of 35 mm and then measuring the time required for hexane to permeate the specimens at a rate of 1 μg/cm$^2$/min

TABLE 1

| | | Example 1 | Example 2 | Example 3 | Example 4 | Example 5 | Example 6 |
|---|---|---|---|---|---|---|---|
| Physical properties of the latex | Content of carboxylic acid on the surface (wt. %) | 6.02 | 5.38 | 5.74 | 5.25 | 5.66 | 5.81 |
| | Content of carboxylic acid in the serum (wt. %) | 0.06 | 0.04 | 0.08 | 0.06 | 0.2 | 0.05 |
| | Content of anion compound present on the surface (wt. %) | 92.6 | 97.8 | 95.7 | 95.5 | 92.7 | 96.8 |
| Physical properties of the glove | Thickness (mm) | 0.065 | 0.064 | 0.065 | 0.065 | 0.064 | 0.065 |
| | Tensile strength (MPa) | 36.3 | 35 | 37.5 | 35 | 35.7 | 37 |
| | Elongation (%) | 588 | 598 | 600 | 617 | 580 | 600 |
| | 300% Modulus (MPa) | 7.6 | 6.6 | 6.8 | 6.4 | 7.2 | 6.9 |

TABLE 1-continued

|  | | Example 1 | Example 2 | Example 3 | Example 4 | Example 5 | Example 6 |
|---|---|---|---|---|---|---|---|
| | Durability (time: hour) | >4 | >4 | >4 | >4 | >4 | >4 |
| | Chemical resistance (penetration period of time) | 40 min | 40 min | 40 min | 40 min | 40 min | 40 min |
| | Content of leached cation | $Al^{3+}$ <0.1 ppm | $Al^{3+}$ <0.1 ppm | $Al^{3+}$ <0.1 ppm | $Al^{3+}$ <0.1 ppm | $Al^{3+}$ <0.1 ppm | $Al^{3+}$ <0.1 ppm |

TABLE 2

| | | Comparative Example 1 | Comparative Example 2 | Comparative Example 3 | Comparative Example 4 |
|---|---|---|---|---|---|
| Physical properties of the latex | Content of carboxylic acid on the surface (wt. %) | 3.3 | 3.9 | 5.72 | 3.81 |
| | Content of carboxylic acid in the serum (wt. %) | 0.04 | 0.5 | 0.07 | 0.06 |
| | Content of anion compound present on the surface (wt. %) | 74.3 | 68.0 | 75.3 | 75.3 |
| Physical properties of the glove | Thickness (mm) | 0.064 | 0.065 | 0.063 | 0.065 |
| | Tensile strength (MPa) | 20 | 24 | 36 | 29 |
| | Elongation (%) | 580 | 610 | 567 | 604 |
| | 300% Modulus (MPa) | 4.0 | 5.8 | 8.1 | 6.2 |
| | Durability (time: hour) | 10 min | 50 min | >4 hours | 10 min |
| | Chemical resistance (penetration period of time) | 6 min | 10 min | 35 min | 5 min |
| | Content of leached cation | $Al^{3+}$ <0.1 ppm | $Al^{3+}$ <0.1 ppm | $Zn^{2+}$ 40 ppm | $Zn^{2+}$ 100 ppm |

Referring to Table 1, it can be seen that in the case of dip-molded products of Example 1 to Example 6, since the content of carboxylic acid on the surface is as high as 5.25 to 6.02 wt. %, the durability and chemical resistance are excellent and thus desired physical properties can be achieved even when cross-linking by ionic bond between anionic compound and multivalent cationic compound is performed. Also, since the extracted aluminum cation in the acidic solution is less than 0.1 ppm, it can be seen that the aluminum cation maintains a strong ionic bond.

Referring to Table 2, when the anionic compound was not further added in a divided injection as in Comparative Example 1, the content of carboxylic acid present on the surface was reduced to about 50% and this resulted in a significant decrease in the durability and chemical resistance.

Also, as in Comparative Example 2, when divided injection was carried out at the polymerization conversion level of 60%, the content of carboxylic acid was slightly increased, and thus the durability and chemical resistance was slightly increased.

Also, as in Comparative Examples 3 and 4, when the zinc oxide was used as a cross-linking agent, the physical properties were somewhat similar to Example 1 to 4, but there arise serious problems that the zinc cation leached from the zinc oxide is increased to 100 ppm and so forth.

The latex composition for dip-molding according to the present invention can be used for the production of latex articles such as health care products such as various industrial and household gloves.

The invention claimed is:

1. A carboxylic acid-modified nitrile-based copolymer latex prepared by copolymerizing components comprising monomers including a conjugated diene-based monomer, an ethylenically unsaturated nitrile-based monomer, an unsaturated carboxylic acid monomer, an unsaturated dicarboxylic acid monomer; and a sulfur oxyanion compound,
   wherein 80 wt. % or more of a total content of the unsaturated carboxylic acid monomer, the unsaturated dicarboxylic acid monomer and the sulfur oxyanion compound is present in a copolymerized state on a surface of a carboxylic acid-modified nitrile-based copolymer latex particles, and
   wherein in the copolymerizing, the sulfur oxyanion compound is contained in an amount of 0.1 to 2 parts by weight is used relative to 100 parts of the monomers, wherein the conjugated diene-based monomer is contained in an amount of 35 wt. % to 80 wt. % of is used based on a total content of the monomers, the ethylenically unsaturated nitrile-based monomer is contained in an amount of 20 wt. % to 50 wt. % of based on a total content of the monomers, the unsaturated carboxylic acid monomer is contained in an amount of 2 wt. % to 10 wt. % based on a total content of the monomers, and the unsaturated dicarboxylic acid monomer is contained in an amount of 0.1 wt. % to 3 wt. % based on a total content of the monomers.

2. The carboxylic acid-modified nitrile-based copolymer latex according to claim 1, wherein the conjugated diene-based monomer is at least one selected from the group consisting of 1,3-butadiene, 2,3-dimethyl-1,3-butadiene, 2-ethyl-1,3-butadiene, 1,3-pentadiene and isoprene.

3. The carboxylic acid-modified nitrile-based copolymer latex according to claim 1,
wherein the ethylenically unsaturated nitrile-based monomer is at least one selected from the group consisting of acrylonitrile, methacrylonitrile, fumaronitrile, α-chloronitrile and α-cyanoethyl acrylonitrile.

4. The carboxylic acid-modified nitrile-based copolymer latex according to claim 1,
wherein the unsaturated carboxylic acid monomer is at least one selected from the group consisting of acrylic acid and methacrylic acid.

5. The carboxylic acid-modified nitrile-based copolymer latex according to claim 1,
wherein the unsaturated dicarboxylic acid monomer is at least one selected from the group consisting of itaconic acid, maleic acid, fumaric acid and glutaconic acid.

6. The carboxylic acid-modified nitrile-based copolymer latex according to claim 1,
wherein the sulfur oxyanion compound is selected from the group consisting of persulfate initiator, sodium allyl sulfonate, and sodium styrene sulfonate.

7. A latex composition for dip-molding comprising the carboxylic acid-modified nitrile-based copolymer latex according to claim 1; and a multivalent metal cation compound.

8. The latex composition for dip-molding according to claim 7,
wherein the multivalent metal cation compound is one selected from the group consisting of aluminum hydroxide, aluminum sulfate, aluminum chloride, aluminum lactate and aluminum acetylacetonate.

9. The latex composition for dip-molding according to claim 7,
wherein the latex composition for dip-molding contains 0.1 to 5 parts by weight of the multivalent metal cation compound relative to 100 parts by weight of the carboxylic acid-modified nitrile-based copolymer latex.

10. A dip-molded product prepared by dip-molding the latex composition for dip-molding according to claim 7.

11. The dip-molded product according to claim 10,
wherein a content of metal cations leached from the dip-molded products is less than 0.1 ppm.

12. The carboxylic acid-modified nitrile-based copolymer latex according to claim 1,
wherein the total content of the unsaturated carboxylic acid monomer, the unsaturated dicarboxylic acid monomer and the sulfur oxyanion compound present in the copolymerized state on the surface of the carboxylic acid-modified nitrile-based copolymer latex particles is 85 wt. % to 99.5 wt. %.

13. A method of preparing a carboxylic acid-modified nitrile-based copolymer latex, comprising:
polymerizing components comprising a conjugated diene-based monomer, an ethylenically unsaturated nitrile-based monomer, an unsaturated carboxylic acid monomer, an unsaturated dicarboxylic acid monomer and the sulfur oxyanion compound,
wherein any one of the unsaturated carboxylic acid monomer, the unsaturated dicarboxylic acid monomer or the sulfur oxyanion compound is further injected in a divided injection at the time a polymerization conversion rate is of 10 to 50% during the polymerization so that 80 wt. % or more of a total content of the unsaturated carboxylic acid monomer, the unsaturated dicarboxylic acid monomer and the sulfur oxyanion compound based on a total content of monomers is present in a copolymerized state on a surface of carboxylic acid-modified nitrile-based copolymer latex particles.

14. The method according to claim 13,
wherein the divided injection is carried out in an amount of 30 wt. % or less of the total injection amount of the unsaturated carboxylic acid monomer, the unsaturated dicarboxylic acid monomer and the sulfur oxyanion compound.

* * * * *